United States Patent [19]

Ball et al.

[11] 4,187,542

[45] Feb. 5, 1980

[54] PROCESS CONTROL METHOD AND APPARATUS

[75] Inventors: Donald H. Ball; James D. Voelkers, both of Bartlesville, Okla.

[73] Assignee: Phillips Petroleum Company, Bartlesville, Okla.

[21] Appl. No.: 907,386

[22] Filed: May 18, 1978

[51] Int. Cl.² .......................... G06F 15/46; F23N 1/00
[52] U.S. Cl. .................................. 364/502; 23/230 A; 236/15 E; 422/109; 431/12; 364/116
[58] Field of Search ............... 364/500, 501, 502, 116, 364/118; 23/253 A, 230 A; 236/14, 15 E, 1 A; 137/6, 7, 90; 431/2, 12; 423/352, 359, 360; 208/DIG. 1, 134

[56] References Cited

U.S. PATENT DOCUMENTS

| | | | |
|---|---|---|---|
| 3,722,811 | 3/1973 | Osburn | 236/14 |
| 3,824,388 | 7/1974 | Cugini | 364/501 |
| 3,993,447 | 11/1976 | Buss et al. | 364/116 |
| 4,028,194 | 6/1977 | Boyd | 364/501 X |

*Primary Examiner*—Joseph F. Ruggiero

[57] ABSTRACT

A method and apparatus is provided for controlling the operation of a reforming furnace used to decompose at least a portion of a feed stream. A byproduct fuel from subsequent process steps, which is a result of decomposition of the feed in the reforming furnace, is used as one fuel source to fire the reforming furnace. A supplemental fuel such as natural gas is used as a supplemental fuel source to fire the furnace. The control system provides a prediction of the heat required to decompose the feed in the furnace. The amount of heat which can be supplied by the byproduct fuel stream is then determined. This amount of heat is subtracted from the total predicted heat required and sufficient supplemental fuel is supplied to make up the difference between the predicted required heat and the heat which can be supplied by the byproduct fuel stream.

The control system also monitors the temperature of the effluent flowing from the reforming furnace. A comparison of the measured temperature with the required temperature provides a basis for correcting any errors in the predicted heat requirement. In this manner, use of the byproduct fuel stream is maximized while still maintaining the effluent from the reforming furnace at a desired temperature.

18 Claims, 3 Drawing Figures

PROCESS CONTROL METHOD AND APPARATUS

This invention relates to method and apparatus for controlling the heat input to a furnace. In a particular aspect this invention relates to method and apparatus for controlling fuel input to a furnace so as to maximize the use of a byproduct fuel and minimize the use of a supplemental fuel while still providing the required heat input to a furnace.

In various processes, such as an ammonia synthesis process, a reforming furnace is commonly used to decompose a hydrocarbon feed. In such processes, the final byproducts include a combustible fuel portion which can be returned to the reforming furnace to be used as fuel to heat the feed hydrocarbon to its decomposition temperature. However, there will seldom be sufficient quantity of this byproduct combustible fuel available to provide sufficient heat to the reforming furnace for its proper operation. Therefore, it is necessary to add supplemental fuel (the term supplemental fuel is used even though the majority of the heat may be supplied by the supplemental fuel because substantially all of the byproduct combustible fuel is used and the supplemental fuel is used to supplement the byproduct combustible fuel) to the furnace to insure that sufficient heat is available for decomposing the feed hydrocarbon. It is desirable in such processes, to maximize the use of the byproduct combustible fuel and minimize the use of the supplemental fuel while still providing sufficient heat to the reforming furnace for its proper operation. Therefore, it is important to have a control system which will minimize the use of supplemental fuel in the reforming furnace while still providing the required heat input to the reforming furnace.

Accordingly, it is an object of this invention to provide method and apparatus for controlling the heat input to a furnace. It is a particular object of this invention to provide method and apparatus for controlling the fuel input to a furnace so as to maximize the use of a byproduct fuel and minimize the use of a supplemental fuel while still providing the required heat input to the reforming furnace.

In accordance with the present invention, method and apparatus is provided whereby the flow rate of the feed gas to the reforming furnace is utilized to predict the required heat input to the reforming furnace. The amount of heat which can be supplied by the byproduct combustible fuel is then determined and is compared to the total required heat which must be supplied to the reforming furnace. The flow rate of the supplemental fuel is then controlled to supply sufficient heat to make up the difference between the total predicted required heat for the reforming furnace and the heat which can be supplied by the byproduct combustibe fuel.

The actual temperature of the effluent flowing from the reforming furnace is measured and is checked to be certain that the actual temperature measurement is a valid temperature measurement. The actual temperature of the effluent flowing from the reforming furnace is then compared to a desired temperature for the effluent flowing from the reforming furnace and this comparison is utilized to update the prediction of the required heat input to the furnace. The flow rate of the supplemental fuel is then adjusted to compensate for any difference between the predicted required heat and the actual required heat as determined by the measurement of the temperature of the effluent flowing from the reforming furnace. In this manner both feed forward and feedback control of the heat input to the reforming furnace is provided to thereby minimize the use of supplemental fuel in the reforming furnace while providing the required heat input to the reforming furnace.

Other objects and advantages of the invention will be apparent from the detailed description of the invention and the appended claims as well as from the detailed description of the drawings in which:

Figure 1:
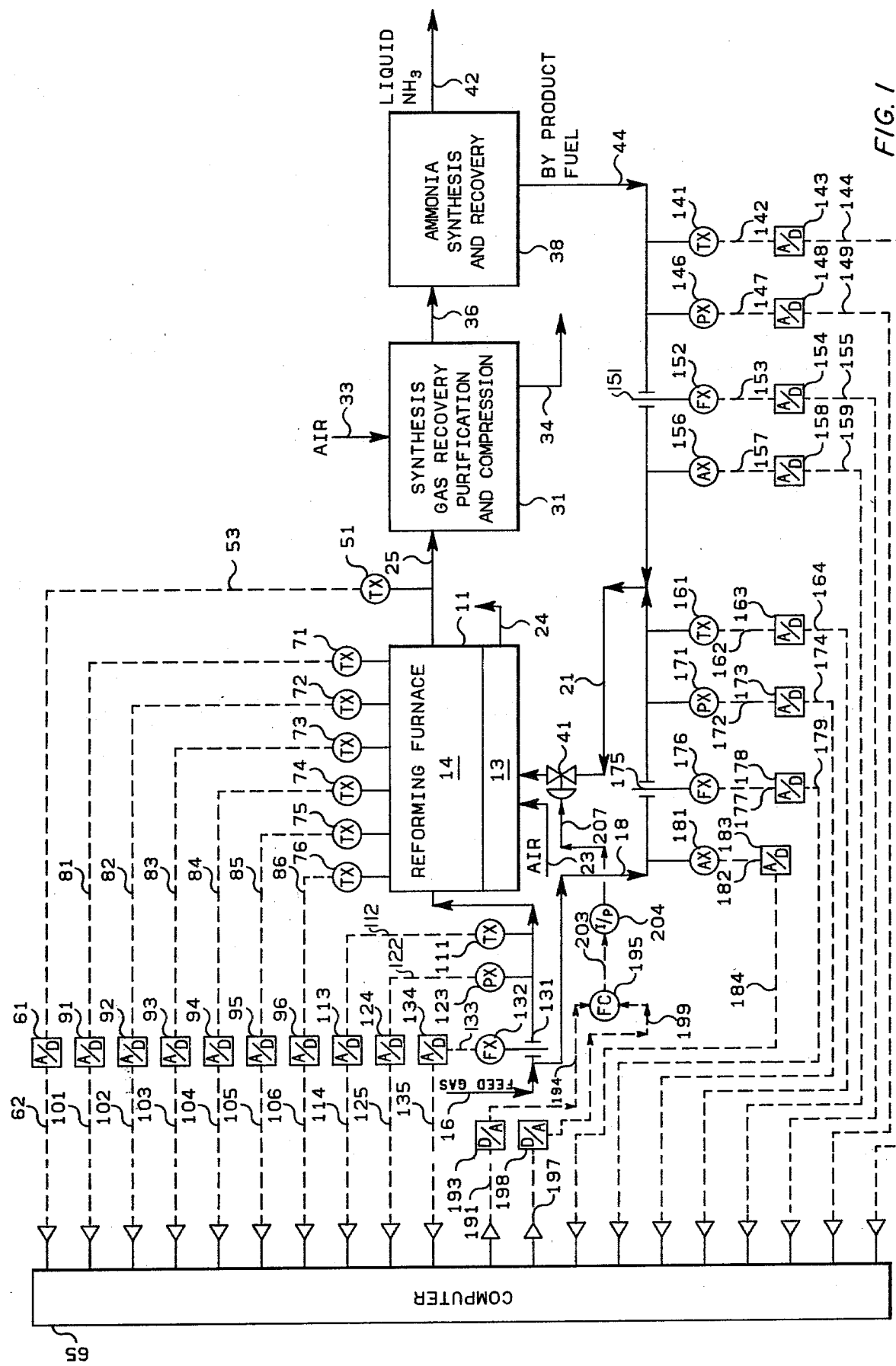
FIG. 1 is a diagrammatic representation of an ammonia synthesis process with an associated control system for controlling the heat input to the reforming furnace.

For purposes of illustration the apparatus is described in terms of an ammonia synthesis plant. However, it is to be understood that the control system can be used with other processes in which a byproduct stream produced in a downstream process step is used as a fuel source to fire a furnace.

Although the invention is illustrated and described in terms of a specific process and a specific control configuration, the applicability of the invention described herein extends to other control system configurations which would accomplish the purpose of the invention. The invention is described in terms of using a digital computer to make the required calculations to control the process. However an analog computer could be utilized if desired. Lines designated as signal lines in the drawings are electrical in this preferred embodiment. However, the invention is also applicable to pneumatic, mechanical, hydraulic, or other signal means for transmitting information. In almost all control systems some combination of these types of signals will be used. However, use of any other type of signal transmission, compatible with the process and equipment in use, is within the scope of the invention.

The controller shown may utilize the various modes of control such as proportional, proportional-integral, proportional-derivative, or proportional-integral-derivative. In this preferred embodiment, proportional-integral controllers are utilized. The operation of these types of controller is well known in the art. The output control signal of a proportional-integral controller may be represented as $$S = K_1 E + K_2 \int E \, dt$$

where

S = output control signal;
E = difference between two input signals; and
$K_1$ and $K_2$ = constants.

The various transducing means used to measure parameters which characterize the process in the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic control elements, such as pneumatically operated valve means 41, in conjunction with electrical signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. In addition, all signals could be translated into a "suppressed zero" or other similar format in order to provide a "live zero" and prevent an equipment failure from being erroneously interpreted as a "low" or "high" measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings, and in particular to FIG. 1, there is illustrated a reforming furnace 11 having a burner section 13 and a reforming section 14. The reforming section 14 of the reforming furnace 11 consists of a plurality of tubular reaction chambers which are commonly called riser tubes. The riser tubes are oriented perpendicular to the burner section 13. A feed gas is supplied to the reforming section 14 of the reforming furnace 11 through conduit means 16. In this preferred embodiment of the invention the feed gas utilized is natural gas and the natural gas is also supplied as a fuel gas to the burner section 13 of the reforming furnace 11 through conduit means 18 which is operably connected to conduit means 21. Air is supplied to the burner section 13 of the reforming furnace 11 through conduit means 23. Combustion products from the burner 13 are discharged through a vent or stack 24.

The hydrocarbon feed fed to the reforming furnace 11 is cracked, decomposed or otherwise converted by heat supplied from the burner section 13. For example, if the hydrocarbon feed is natural gas, which contains methane and ethane, the feed can be cracked thermally or catalytically in the presence of steam to produce a hot gas mixture principally comprising hydrogen, carbon monoxide and carbon dioxide. This hot gas mixture is discharged from the reforming furnace 11 through conduit means 25 and is supplied to the synthesis gas recovery, purification and compression section 31. Air is also supplied to the synthesis gas recovery, purification and compression section 31 through conduit means 33. The synthesis gas recovery, purification and compression section 31 is operable for recovering, purifying and compressing ammonia synthesis gas. Impurities removed by the purification steps are discharged through conduit means 34. The synthesis gas mixture, which is made up principally of hydrogen and nitrogen with low concentrations of argon, helium and methane, is discharged from the synthesis gas recovery, purification and compression section 31 through conduit means 36 and is supplied to the ammonia synthesis and recovery section 38. The ammonia synthesis and recovery section 38 is operable for converting at least a portion of the hydrogen and nitrogen to ammonia. The ammonia synthesis and recovery section 38 is also operable for separating the ammonia from a recirculating synthesis gas stream, a portion of which gas stream is withdrawn and returned as a byproduct fuel stream for the burner section 13 of the reforming furnace 11 through conduit means 44 which is operably connected to conduit means 21. Ammonia is withdrawn from the ammonia synthesis and recovery section 38 through conduit means 42. The byproduct fuel stream flowing through conduit means 44 will be at a higher pressure than the natural gas fuel stream flowing through conduit means 18. Thus, all of the byproduct fuel stream will be utilized to supply heat to the reforming furnace 13 with the natural gas flowing through conduit means 18 being utilized as a supplemental fuel to maintain the required temperature in reforming section 14 of the reforming furnace 11.

The temperature of the effluent flowing from the reforming furnace 11 through conduit means 25 must be maintained at a desired level to insure that maximum conversion of the feed gas is occurring in the reforming furnace 11. If the temperature of the effluent flowing through conduit means 25 from the reforming furnace 11 is too low, then the feed gas will not be fully decomposed which will result in waste and an economic loss in the ammonia synthesis process illustrated in FIG. 1. If the temperature of the effluent flowing through conduit means 25 is too high then fuel is being wasted, again representing an economic loss for the ammonia synthesis process. The control system illustrated in FIG. 1 is operable for maintaining the temperature of the effluent flowing through conduit means 25 at a desired level while maximizing the use of the byproduct fuel and minimizing the use of the more expensive natural gas fuel flowing through conduit means 18. The temperature of the effluent flowing through conduit means 25 is measured by means of a temperature measuring device such as a thermocouple. Signal 53 which is representative of the actual temperature of the effluent flowing through conduit means 25 is transmitted by temperature transducer 51 to the analog-to-digital (A/D) converter 61. Signal 53 is converted to digital form and is supplied as signal 62 from the analog-to-digital converter 61 to computer means 65.

The temperatures of a plurality of the riser tubes in the reforming section 14 of the reforming furnace 11 are measured by a plurality of temperature sensing devices such as thermocouples. In this preferred embodiment six different measurements are obtained, but a different number could be utilized if desired. Signals 81-86, which are representative of the six different riser tube tempertures respectively, are transmitted by temperature transducers 71-76 respectively to the A/D converters 91-96 respectively. Signals 81-86 are converted to digital form by the A/D converters 91-96 and are supplied as signals 101-106 respectively to computer means 65.

Temperature transducer 111 supplies a signal 112 representative of the actual temperature of the feed gas flowing through conduit means 16 to the A/D converter 113. Signal 112 is converted to digital form by the A/D converter 113 and is supplied as signal 114 to computer means 65. Pressure transducer 123 supplies a signal 122 representative of the actual pressure of the feed gas flowing through conduit means 16 to the A/D converter 124. Signal 122 is converted to digital form by the A/D converter 124 and is supplied as signal 125 to the computer means 65. Flow sensor 131 and flow transducer 132 supplies signal 133 representative of the actual flow rate of the feed gas flowing through conduit means 16 to A/D converter 134. Signal 133 is converted to digital form by A/D converter 134 and is supplied as signal 135 to computer means 65.

Temperature transducer 141 provides a signal 142 representative of the actual temperature of the byproducts fuel flowing through conduit means 44 to the A/D converter 143. Signal 142 is converted to digital form by the A/D converter 143 and is supplied as signal 144 to the computer means 65. Pressure transducer 146 provides a signal 147 representative of the actual pressure of the byproduct fuel flowing through conduit means 44 to the A/D converter 148. Signal 147 is converted to digital form by the A/D converter 148 and is supplied as signal 149 to computer means 65. Flow sensor 151 and flow transducer 152 provide a signal 153 representative of the actual flow rate of the byproduct fuel flowing through conduit means 44 to the A/D converter 154. Signal 153 is converted to digital form by the A/D converter 154 and is supplied as signal 155 to the computer means 65. Analyzer transducer 156 provides a signal 157 representative of the BTU content of the byproduct fuel flowing through conduit means 44 to the A/D converter 158. Signal 157 is converted to digital form by the A/D converter 158 and is supplied as signal 159 to computer means 65. The BTU content of the byproduct fuel will be determined primarily by the hydrogen and methane concentration in the byproduct fuel. The analyzer transducer 156 which in this preferred embodiment is a chromatographic analyzer analyzes the concentration of the hydrogen and methane in the byproduct fuel and converts this concentration to a BTU analysis of the byproduct fuel.

Temperature transducer 161 provides a signal 162 representative of the actual temperature of the supplemental fuel gas flowing through conduit means 18 to the A/D converter 163. Signal 162 is converted to digital form by the A/D converter 163 and is supplied as signal 164 to computer means 65. Pressure transducer 171 provides a signal 172 which is representative of the actual pressure of the supplemental fuel gas flowing through conduit means 18 to the A/D converter 173. Signal 172 is converted to digital form by the A/D converter 173 and is supplied as signal 174 to computer means 65. Flow sensor 175 and flow transducer 176 provide a signal 177 which is representative of the actual flow rate of the supplemental fuel gas flowing through conduit means 18 to the A/D converter 178. Signal 177 is converted to digital form by the A/D converter 178 and is provided as signal 179 to computer means 65. Analyzer transducer 181 provides a signal 182 representative of the BTU content of the supplemental fuel gas flowing through conduit means 18 to the A/D converter 183. Signal 182 is converted to digital form by the A/D converter 183 and is provided as signal 184 to computer means 65. In some cases the BTU content of the supplemental fuel gas will be relatively constant and can simply be supplied as a set point to computer means 65 rather than using the analyzer transducer, which is a chromatographic analyzer in this preferred embodiment, to determine the BTU content of the supplemental fuel gas flowing through conduit means 18.

Computer means 65 processes the input signals described in the previous paragraphs and provides two output signals to flow controller 195. Signal 191 is representative of the total BTUs which are being supplied to the burner section 13 of the reforming furnace 11 by the byproduct fuel and the supplemental fuel. Signal 191 is supplied to the digital-to-analog (D/A) converter 193 and is provided in analog form as signal 194 to flow controller 195. Signal 197 is representative of the BTU flow to the burner section 13 of the reforming furnace 11 which is required to maintain the desired temperature for the effluent flowing through conduit means 25 from the reforming furnace 11 to insure that sufficient heat is supplied to the reforming section 14 of the reforming furnace 11 to convert the feed gas flowing through conduit means 16. Signal 197 is converted to analog form by the D/A converter 198 and is supplied as signal 199 as a second input to the flow controller 195. The flow controller 195 provides a signal 203 which is responsive to the difference between signals 194 and 199 to the current-to-pneumatic transducer 204. Signal 207 which is a pneumatic representation of signal 203 is provided to pneumatic control valve 41 which is located in conduit means 21. The pneumatic control valve 41 is manipulated in response to signal 207 to insure that sufficient heat is being supplied to the forming furnace 11.

Figure 2:
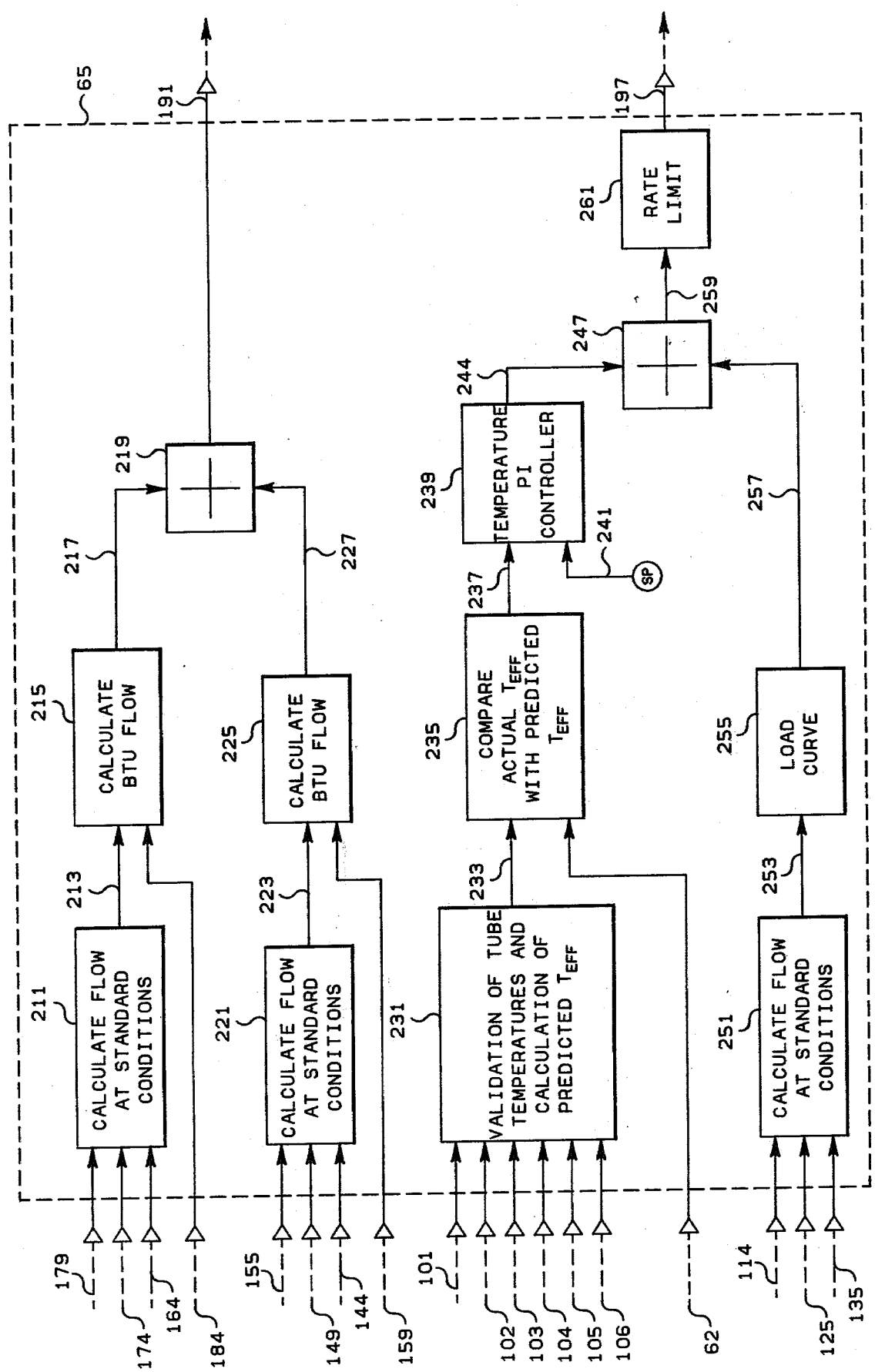
FIG. 2 is a flow diagram of the computer logic utilized in implementing the control system of FIG. 1.

FIG. 2 illustrates a flow diagram for the computer logic utilized to implement the control system illustrated in FIG. 1. As is illustrated in FIG. 2, signals 179, 174 and 164 which are representative of the measured flow rate, the measured pressure and the measured temperature, respectively, of the supplemental fuel flowing through conduit means 18 are supplied to block 211 of the illustrated flow diagram. Signals 179, 174 and 164 are utilized to calculate the flow rate of the supplemental fuel flowing through conduit means 18 at standard conditions utilizing equation (I).

$$F_{STD} = (F_{MEAS}) \left( \sqrt{\frac{T_{STD}}{T_{MEAS}}} \right) \left( \sqrt{\frac{P_{MEAS}}{P_{STD}}} \right) \quad (I)$$

where
$F_{STD}$=flow rate at standard conditions;
$F_{MEAS}$=measured flow rate;
$T_{STD}$=standard temperature;
$T_{MEAS}$=measured temperature;
$P_{STD}$=standard pressure; and
$P_{MEAS}$=measured pressure.

Signal 213 which is representative of the flow rate of the supplemental fuel flowing through conduit means 18 at standard conditions is supplied from block 211 to block 215 of the flow diagram. Block 215 is also supplied with signal 184 which is representative of the BTU value of the supplemental fuel flowing through conduit means 18. The BTU flow which is being provided by the supplemental fuel flowing through conduit means 18 is calculated in block 215 by multiplying the flow rate at standard conditions represented by signal 213 by the BTU value of the supplemental fuel represented by signal 184. Signal 217, representative of the BTU flow being provided by the supplemental fuel is supplied as one input to summing means to 219.

Signals 155, 149, and 144 which are representative of the measured flow rate, measured pressure and measured temperature, respectively, of the byproduct fuel flowing through conduit means 44 are supplied to block 221 of the flow diagram. The flow rate of the byproduct fuel flowing through conduit means 44 is calculated at standard conditions in block 221 using equation (I). Signal 223 representative of the flow rate of the byproduct fuel flowing through conduit means 44 at standard conditions is provided as one input to block 225 of the flow diagram. Signal 159 which is representative of the BTU content of the byproduct fuel flowing through conduit means 44 is supplied as a second input to block 225 of the flow diagram. The BTU flow which is being provided by the byproduct fuel flowing through conduit means 44 is calculated in block 225 by multiplying signals 223 by signal 159. Signal 227 representative of the BTU flow which is being provided by the byproduct fuel flowing through conduit means 44 is supplied from block 225 as a second input to the summing means 219.

Signals 217 and 227 are summed by the summing means 219 to provide signal 191 which is representative of the total BTU flow through conduit means 21 to the burner section 13 of the reforming furnace 11 as has been previously described.

The temperature of the effluent flowing through conduit means 25 from the reforming furnace 11 is one of the principal measurements utilized in the control system illustrated in FIG. 1. Because of the high temperatures of the effluent flowing through conduit means 25 which will usually be in the range of approximately 1500° F. (816° C.) the thermocouple used to measure the temperature of the effluent flowing through conduit means 25 will gradually fail over a period of time. The control system illustrated in FIG. 1 provides a method by which the validity of the effluent temperature measurement may be checked periodically. The manner in which this is accomplished is illustrated in FIG. 2.

Signals 101–106 which are representative of measurements of the temperature of six riser tubes in the reforming section 14 of the reforming furnace 11 are provided as inputs to block 231 of the flow diagram illustrated in FIG. 2. The average temperature from a previous measurement of the temperatures of the six riser tubes in the reforming section 14 of the reforming furnace 11 is retained in block 231 of the flow diagram. Each of the signals 101–106 is compared to the average temperature from the previous measurement to validate each new measurement of the riser tube temperatures. If the new measurement is not within 5° F. (2.77° C.) of the old average temperature measurement, the new measurement is considered invalid in the preferred embodiment of this invention. In the preferred embodiment of this invention if at least four of the new measurements of the riser tube temperatures are valid, then the valid temperature measurements are averaged to obtain a new average riser tube temperature. If less than four of the new measured temperatures are valid then all of the new measurements are disregarded and six new measurements of the riser tube temperature are supplied to block 231 of the flow diagram and the validation procedure described above is repeated. The new average riser tube temperature is utilized to predict what the temperature of the effluent flowing through conduit means 25 should be by adding 10° F. (5.55° C.) to the new average tube temperature in the preferred embodiment of this invention. Signal 233 which is representative of the predicted effluent temperature flowing through conduit means 25 is provided as one input to block 235 of the flow diagram. Signal 62 which is representative of the measured temperature of the effluent flowing through conduit means 25 is provided as a second input to block 235 of the flow diagram. In the preferred embodiment of the invention if the measured temperature is within 5° F. (2.77° C.) of the predicted temperature, then the measured temperature is provided as signal 237 from block 235 of the flow diagram to block 239 of the flow diagram. If the measured temperature represented by signal 62 is not within 5° F. (2.77° C.) of the predicted temperature represented by signal 233, then the procedure set forth above is repeated until a valid temperature measurement is obtained. In some cases the thermocouple utilized to measure the temperature of the effluent flowing through conduit means 25 must be replaced to obtain a valid temperature measurement. Block 239 of the flow diagram, which operates as a temperature proportional-integral controller, is supplied with a set point 241 as a second input. The set point 241 is representative of the required temperature for the effluent flowing through conduit means 25 to insure that sufficient heat is being supplied to the reforming furnace 11 to convert the feed gas flowing through conduit means 16. Signal 244, which is representative of any increase or decrease in the BTU flow to the reforming furnace 11 which is needed to make signals 241 and 237 equal, is supplied from block 239 of the flow diagram as one input to the summing means 247 of the flow diagram.

Signals 114, 125 and 135 which are representative of the measured temperature, measured pressure and measured flow rate, respectively, of the feed gas flowing through conduit means 16 to the reforming furnace 11 are supplied to block 251 of the flow diagram. The flow rate of the feed gas flowing through conduit means 16 at standard conditions is calculated in block 251 of the flow diagram utilizing equation (I). Signal 253 which is representative of the flow rate of the feed gas flowing through conduit means 16 at standard conditions is supplied to block 255 of the flow diagram. Block 255 of the flow diagram is a load curve which provides the relationship between the flow rate of the feed gas at standard conditions and the BTU required to convert the feed gas. Signal 257 is thus representative of the predicted BTU flow to the reforming furnace 11 required to convert the feed gas flowing to conduit means 16 to the reforming furnace 11. Signal 257 is supplied as a second input to summing means 247.

If the model provided by the load curve in block 255 of the flow diagram was perfect, then the measurements of the temperature of the effluent and comparison of the measured temperature with a required temperature would not be necessary because the temperature of the effluent would be maintained at the required temperature by the model represented by the load curve. However, it is generally not possible to model a process such as that carried out by a reforming furnace under all conditions. Because of this the model is utilized to provide a very fast prediction of the BTU requirement of the reforming furnace for any given flow rate of the feed gas through conduit means 16. Signal 244 is then utilized to adjust the predicted BTU requirement to compensate for any errors or inaccuracies that exist in the model represented by the load curve in block 255 of the flow diagram. Thus signals 244 and 257 are summed by summing means 247 to provide signal 259 which is representative of the required BTU flow to the reforming furnace 11. Signal 259 is supplied from summing means 247 to the rate limit block 261 of the flow diagram. The rate limit block 261 simply prevents any disturbance from changing the BTU input to the reforming furnace 11 too quickly. Signal 197 which will be equal to signal 259 unless the rate limit has been surpassed is provided as a computer output to the flow controller 195 as is illustrated in FIG. 1.

Figure 3:
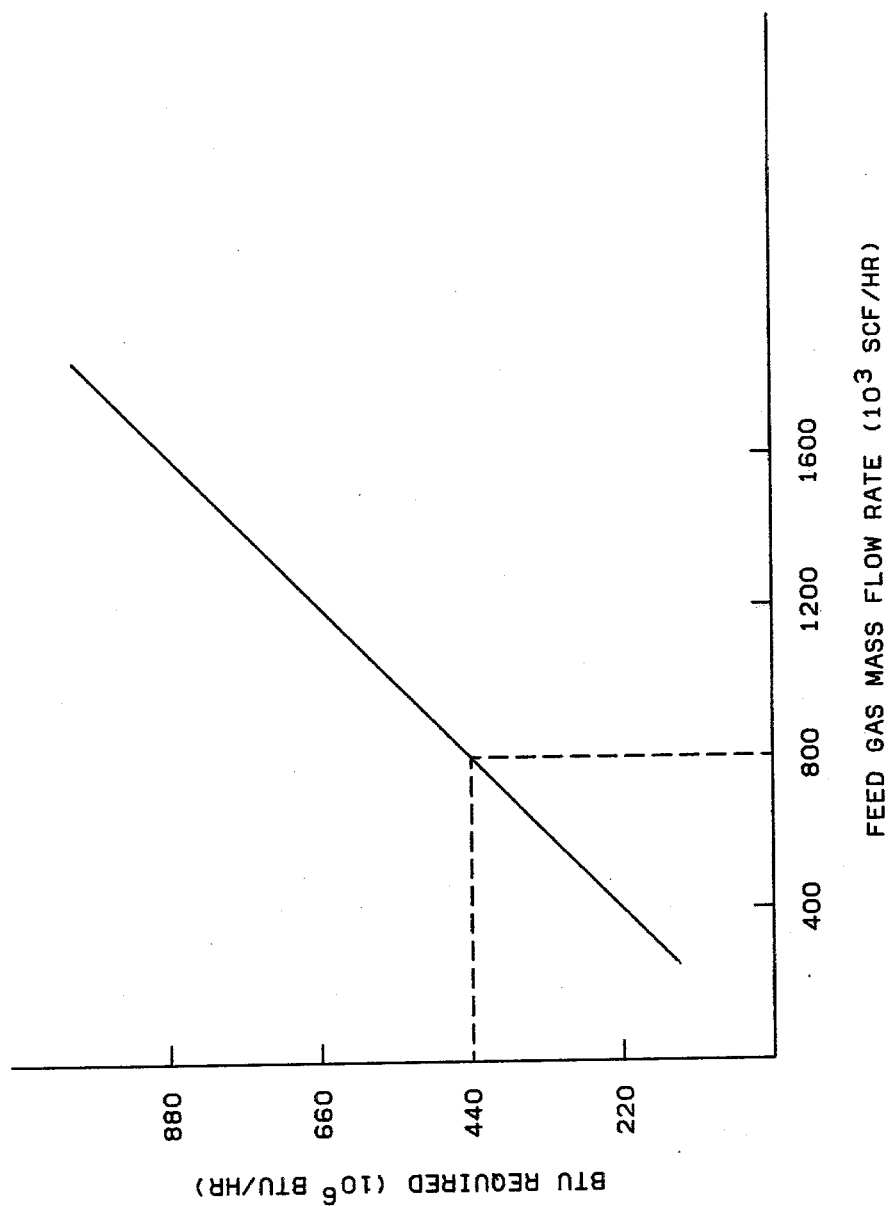
FIG. 3 is a graphical illustration of the relationship between the flow rate of the feed gas to the reforming furnace and the required heat input to the reforming furnace.

FIG. 3 is illustrative of a preferred load curve in the present invention. In FIG. 3, the feed gas flow rate at standard conditions in units of 1000 standard cubic feed per hour is plotted versus the BTU input to the reforming furnace 11 required to convert the feed gas flowing through conduit means 16. The required BTU is in units of one million BTU per hour. As is illustrated in FIG. 3 a straight line relationship is utilized in the present invention. Thus, if the feed gas flow rate at standard conditions is 800,000 standard cubic feet per hour the load curve illustrated in FIG. 3 predicts the 440,000,000 BTU per hour will be required to convert the feed gas flowing through conduit means 16.

In summary the control system of the present invention, as illustrated in FIGS. 1-3, provides maximum usage of a byproduct fuel while still maintaining the required heat input to the reforming furnace of the process. A predicted required heat input is modified by the actual required heat input, as determined from a comparison of the actual temperature of the effluent flowing from the reforming furnace with the required temperature of the effluent flowing from the reforming furnace, to provide a fast yet accurate control of the heat input to the reforming furnace of the process. A temperature validation technique insures that the thermocouple used to measure the temperature of the effluent flowing from the reforming furnace provides an accurate measurement. All flow rates are compensated for pressure and temperature changes to insure that such changes do not affect the accuracy of the control of the heat input to the reforming furnace of the process.

The invention has been described in terms of a preferred embodiment as illustrated in FIGS. 1-3. Specific components which can be used in the practice of the invention as illustrated in FIGS. 1-3 such as flow sensors 131, 151 and 175; and associated flow transducers 132, 152 and 176; flow controller 195; control valve 41; temperature tranducers 51, 111, 141 and 161; pressure transducers 122, 146 and 171 and current-to-pressure transducer 204 are each well known, commercially available control components such as are illustrated and described at length in Perry's Chemical Engineers' Handbook, Fourth Edition, Chapter 22, McGraw-Hill.

A suitable analyzer 156, 181 for determining the BTU content of a fuel gas is the Process Chromatograph System, Model 102, manufactured by Applied Automation Inc., Bartlesville, Okla.

A suitable A/D converter 61, 91-96, 113, 124, 134, 143, 148, 154, 158, 163, 173, 178, and 183 is the MM 5357 8-bit A/D converter manufactured by National Semiconductor Corporation, Santa Clara, Calif. A suitable D/A converter 193, 198 is the AD 559 8-bit D/A converter manufactured by Analog Devices, Norwood, Mass.

While the invention has been described in terms of the presently preferred embodiment, reasonable variations and modifications are possible by those skilled in the art, within the scope of the described invention and the appended claims.

That which is claimed is:

1. Apparatus comprising:
   a furnace means;
   means for supplying a first fuel to said furnace means;
   means for supplying a second fuel to said furnace means, said first fuel being different from said second fuel;
   means for supplying a feed stream to said furnace means;
   means for establishing a first signal representative of the flow rate of said feed stream;
   means for establishing a second signal, representative of the predicted heat input to said furnace means required to reform said feed stream in some desired manner, in response to said first signal;
   means for establishing a third signal representative of the heat being supplied by said first fuel; means for establishing a fourth signal representative of the heat being supplied by said second fuel;
   means for establishing a fifth signal, representative of the total heat being supplied to said furnace means, in response to said third and fourth signals;
   means for establishing a sixth signal representative of the measured temperature of the effluent flowing from said furnace means;
   means for establishing a seventh signal representative of the desired temperature of said effluent flowing from said furnace means;
   means for establishing an eighth signal responsive to the difference between said sixth signal and said seventh signal;
   means for establishing a ninth signal, representative of the actual required heat input to said furnace means, in response to said second signal and said eighth signal;
   means for establishing a control signal responsive to the difference between said fifth signal and said ninth signal; and
   means for manipulating the flow rate of said first fuel and the flow rate of said second fuel in response to said control signal to provide the required heat input to said furnace means.

2. Apparatus in accordance with claim 1 wherein said first fuel is a byproduct fuel stream having a lower heating value than said second fuel and said first fuel is at a higher pressure than said second fuel so that generally all of said first fuel is used as a primary fuel and said second fuel is used as a supplemental fuel as needed.

3. Apparatus in accordance with claim 1 wherein said feed stream is a reformable hydrocarbon.

4. Apparatus in accordance with claim 1 wherein said means for establishing said first signal comprises:
   means for establishing a tenth signal representative of the measured temperature of said feed stream;
   means for establishing an eleventh signal representative of the measured pressure of said feed stream;
   means for establishing a twelfth signal representative of the measured actual flow rate of said feed stream;
   means for establishing said first signal in response to said tenth, eleventh and twelfth signals, said first signal being representative of the flow rate of said feed stream at standard conditions.

5. Apparatus in accordance with claim 4 wherein said means for establishing said second signal comprises:

means for establishing the relationship between the flow rate of said feed stream at standard conditions and the heat input to said furnace means required to reform said feed stream in some desired manner for a given flow rate of said feedstream at standard conditions.

6. Apparatus in accordance with claim 1 wherein said means for establishing said third signal comprises:
   means for establishing a tenth signal representative of the measured temperature of said first fuel;
   means for establishing an eleventh signal representative of the measured pressure of said first fuel;
   means for establishing a twelfth signal representative of the measured actual flow rate of said first fuel;
   means for establishing a thirteenth signal in response to said tenth, eleventh and twelfth signals, said thirteenth signal being representative of the flow rate of said first fuel at standard conditions;
   means for establishing a fourteenth signal representative of the BTU content per unit volume of said first fuel; and
   means for establishing said third signal in response to said thirteenth and fourteenth signals.

7. Apparatus in accordance with claim 1 wherein said means for establishing said fourth signal comprises:
   means for establishing a tenth signal representative of the measured temperature of said second fuel;
   means for establishing an eleventh signal representative of the measured pressure of said second fuel;
   means for establishing a twelfth signal representative of the measured actual flow rate of said second fuel;
   means for establishing a thirteenth signal in response to said tenth, eleventh and twelfth signals, said thirteenth signal being representative of the flow rate of said second fuel as standard conditions;
   means for establishing a fourteenth signal representative of the BTU content per unit volume of said second fuel; and
   means for establishing said fourth signal in response to said thirteenth and fourteenth signals.

8. Apparatus in accordance with claim 1 wherein said means for establishing said fifth signal comprises means for summing said third signal and said fourth signal.

9. Apparatus in accordance with claim 1 wherein said means for establishing said sixth signal comprises:
   means for establishing a plurality of tenth signals representative of the measured temperature of a plurality of riser tubes in said furnace means;
   means for establishing an eleventh signal representative of the predicted temperature of said effluent flowing from said furnace means in response to said plurality of tenth signals; and
   means for comparing said sixth signal and said eleventh signal to determined if said sixth signal is a valid representation of the temperature of said effluent flowing from said furnace means.

10. A method for controlling thermal cracking of at least a portion of a feed stream wherein heat is supplied for cracking by the combustion of first and second fuel streams, said first fuel stream being different from said second fuel stream, said method comprising the steps of:
    establishing a first signal representative of the flow rate of said feed stream;
    establishing a second signal, representative of the predicted heat input required for the thermal cracking process, in response to said first signal;
    establishing a third signal representative of the heat being supplied by said first fuel stream;
    establishing a fourth signal representative of the heat being supplied by said second fuel stream;
    establishing a fifth signal, representative of the total heat being supplied by said first fuel stream and said second fuel stream, in response to said third and fourth signals;
    establishing a sixth signal representative of the measured temperature of the cracked feed stream;
    establishing a seventh signal representative of the desired temperature of said cracked feed stream;
    establishing an eighth signal responsive to the difference between said sixth signal and said seventh signal;
    establishing a ninth signal representative of the actual required heat input for said thermal cracking process, in response to said second signal and said eighth signal;
    establishing a control signal responsive to the difference between and fifth signal and said ninth signal; and
    manipulating the flow rate of said first fuel stream and the flow rate of said second fuel stream in response to said control signal to provide the required heat input to said thermal cracking process.

11. A method in accordance with claim 10 wherein said first fuel stream is a byproduct fuel stream having a lower heating value than said second fuel stream and said first fuel is at a higher pressure than said second fuel so that generally all of said first fuel is used as a primary fuel and said second fuel is used as a supplemental fuel as needed.

12. A method in accordance with claim 10 wherein said step of establishing said first signal comprises:
    establishing a tenth signal representative of the measured temperature of said feed stream;
    establishing an eleventh signal representative of the measured pressure of said feed stream;
    establishing a twelfth signal representative of the measured flow rate of said feed stream; and
    establishing said first signal in response to said tenth, eleventh, and twelfth signals, said first signal being representative of the flow rate of said feed stream at standard conditions.

13. A method in accordance with claim 12 wherein said step of establishing said second signal comprises:
    establishing the relationship between the flow rate of said feed stream at standard conditions and the heat required for the thermal cracking of at least a portion of said feed stream for a given flow rate of said feed stream at standard conditions.

14. A method in accordance with claim 10 wherein said step of establishing said third signal comprises:
    establishing a tenth signal representative of the measured temperature of said first fuel stream;
    establishing an eleventh signal representative of the measured pressure of said first fuel stream;
    establishing a twelfth signal representative of the measured flow rate of said first fuel stream;
    establishing a thirteenth signal in response to said tenth, eleventh and twelfth signals, said thirteenth signal being representative of the flow rate of said first fuel stream at standard conditions;
    establishing a fourteenth signal representative of the BTU content per unit volume of said first fuel stream; and establishing said third signal in response to said thirteenth signal and said fourteenth signal.

15. A method in accordance with claim 10 wherein said step of establishing said fourth signal comprises:
   establishing a tenth signal representative of the measured temperature of said second fuel stream;
   establishing an eleventh signal representative of the measured pressure of said second fuel stream;
   establishing a twelfth signal representative of the measured flow rate of said second fuel stream;
   establishing a thirteenth signal in response to said tenth, eleventh and twelfth signals, said thirteenth signal being representative of the flow rate of said second fuel stream at standard conditions;
   establishing a fourteenth signal representative of the BTU content per unit volume of said second fuel stream; and
   establishing said fourth signal in response to said thirteenth signal and said fourteenth signal.

16. A method in accordance with claim 10 wherein said step of establishing said fifth signal comprises summing said third signal and said fourth signal.

17. A method in accordance with claim 10 wherein said step of establishing said sixth signal comprises:
   establishing a plurality of tenth signals, each being representative of the temperature of a different heat zone in said thermal cracking process;
   checking each one of said plurality of tenth signals to determine if each one of said plurality of tenth signals is a valid measurement of the temperature of each respective zone of said thermal cracking process;
   obtaining an average temperature of the zones in said thermal cracking process in response to the valid signals in said plurality of tenth signals;
   predicting the temperature of said cracked feed stream based on the average temperature of the zones in said thermal cracking process; and
   comparing said sixth signal, which is representative of the measured temperature of said cracked feed stream, with the predicted temperature of said cracked feed stream to thereby determine if said sixth signal is a valid measurement of the temperature of said cracked feed stream.

18. A method in accordance with claim 10 wherein said step of establishing said ninth signal comprises using said eighth signal to correct any errors in said second signal, which represents a prediction of the heat input required by said thermal cracking process.

* * * * *

UNITED STATES PATENT AND TRADEMARK OFFICE
CERTIFICATE OF CORRECTION

PATENT NO. : 4,187,542
DATED : February 5, 1980
INVENTOR(S) : Donald H. Ball; James D. Voelkers It is certified that error appears in the above-identified patent and that said Letters Patent are hereby corrected as shown below:

Column 11, Claim 7, line 37, "as" should read --- at ---.

Column 12, Claim 10, line 21, "and" first occurrence should read -- said --.

Signed and Sealed this

Twenty-sixth Day of August 1980

[SEAL]

Attest:

SIDNEY A. DIAMOND

Attesting Officer

Commissioner of Patents and Trademarks